United States Patent [19]
Henry

[11] Patent Number: 5,898,990
[45] Date of Patent: May 4, 1999

[54] METHOD OF ASSEMBLING A MAGNET RING ON A ROTOR

[75] Inventor: Rassem Ragheb Henry, Clinton Township, Mich.

[73] Assignee: General Motors Corporation, Detroit, Mich.

[21] Appl. No.: 08/839,516

[22] Filed: Apr. 14, 1997

[51] Int. Cl.$^6$ .................................................. H02K 15/02
[52] U.S. Cl. ............................................................ 29/598
[58] Field of Search ................................ 29/598; 310/156

[56] References Cited

U.S. PATENT DOCUMENTS

| | | | |
|---|---|---|---|
| 4,812,696 | 3/1989 | Stanley | 29/598 |
| 5,144,735 | 9/1992 | Stark | 29/598 |
| 5,402,024 | 3/1995 | Watanabe et al. | 310/156 |
| 5,402,025 | 3/1995 | Saito et al. | 310/156 |

OTHER PUBLICATIONS

*Patent Abstracts of Japan*, vol. 015, No. 379 (E–1115), Sep. 25, 1991: JP 03 150030 A (Shibaura Engine Works Co., Ltd.), Jun. 26, 1991.

*Patent Abstracts of Japan*, vol. 095, No. 007, Aug. 31, 1995: JP 07 107687 A (Toyota Motor Corporation), Apr. 21, 1995.

*Patent Abstracts of Japan*, vol. 096, No. 006, Jun. 28, 1996: JP 08 047188 A (Daido Steel Co., Ltd.) Feb. 16, 1996.

*Patent Abstracts of Japan*, vol. 096, No. 012, Dec. 26, 1996: JP 08 223838 A (Fuji Electric Co., Ltd.), Aug. 30, 1996.

*Patent Abstracts of Japan*, vol. 017, No. 630 (E–1463), Nov. 22, 1993: JP 05 199686 A (Matsushita Electric Ind. Co., Ltd.), Aug. 6, 1993.

*Primary Examiner*—Timothy V. Eley
*Assistant Examiner*—Benjamin M. Halpern
*Attorney, Agent, or Firm*—George A. Grove

[57] ABSTRACT

A method for assembling a permanent magnet ring on a rotor body for an electric motor or generator where the body has a higher coefficient of expansion than the permanent magnet ring includes the steps of sizing the internal diameter of the ring for the greatest thermal expansion of the rotor and introducing longitudinal grooves in the rotor surface uniformly spaced about its circumference to accommodate the expansion of the adhesive used to bond the ring to the rotor.

6 Claims, 2 Drawing Sheets

METHOD OF ASSEMBLING A MAGNET RING ON A ROTOR

TECHNICAL FIELD

This invention relates to making permanent magnet motors, and more particularly it relates to the assembly of a magnet ring on a rotor.

BACKGROUND OF THE INVENTION

Brushless electric motors are finding increasing usage, particularly in automotive applications. Such motors are used or have potential for use in applications such as alternators, electronic throttle controls, electric power steering, fuel pumps, heater and air conditioner blower motors, and engine cooling fans. In a typical brushless motor, a permanent magnet(s) with a plurality of poles of alternating polarity is affixed to a rotor. The rotor is positioned inside a closely-fitting housing which carries electromagnets for propelling the rotor shaft.

In modern brushless electric motor designs, it is preferred to use a ring magnet of suitable permanent magnet composition assembled on a metal rotor such as a steel rotor. The use of a permanent magnet ring simplifies assembly of the structure and provides better structural integrity than mounting a plurality of individual permanent magnet arcs on the rotor. However, the design and assembly of a permanent magnet ring on a metal rotor to form a durable and efficient motor is not without its difficulties.

Permanent magnet rings are now typically formed of rare earth element-transition metal compositions such as neodymium-iron-boron and the like. Materials of these compositions can be formed into rings by sintering magnetically-aligned particles or by hot pressing or hot pressing and hot deforming the magnet particles into ring structures. Regardless of how the ring structures are formed, the designer must be aware that they are not as strong as rotor alloys and design the rotor and permanent magnet ring so that the ring can withstand the tensile stresses introduced into the ring by the high speed rotation of motor operation. However, there is a further and heretofore more difficult problem in the use of such permanent magnet rings on metal rotors. Normally, the coefficient of thermal expansion of the metal rotor is much greater than the coefficient of thermal expansion of the weaker magnet ring. It is desired to maintain as small a gap as possible between a permanent magnet ring and its rotor for purposes of maintaining a strong magnetic field. It is also desirable to maintain the smallest practical air gap between the outside diameter of the permanent magnet ring and the motor housing for the same reason. However, if care is not taken in the design and assembly of the permanent magnet ring on a steel rotor, any thermal expansion of the rotor is likely to break the permanent magnet ring. Heating of the rotor is very likely due to electrical heat generated in the operation of the motor and to environmental heating.

The permanent magnet rings of the iron-neodymium-boron type are usually processed in the form of magnetically-aligned anisotropic structures. Not only do these materials have lower coefficients of thermal expansion in the magnetically-aligned direction than steel, but in the direction transverse to magnetic alignment their coefficient of expansion may even be negative. It is these properties of the otherwise magnetically desirable iron-neodymium-boron type permanent magnets that complicate their use as ring magnets in brushless motors. Obviously, there is a need for improved practice in the assembly of permanent magnet rings on rotors for electric motors.

Heretofore, the solutions to assembling and retaining a permanent magnet ring on a metal rotor have taken two forms. In one solution, a strong metal alloy of low coefficient of thermal expansion, almost equal to that of the magnet material, is interposed as a ring between the steel rotor and the permanent magnet ring. This solution is illustrated, for example, in U.S. Pat. No. 5,402,025 to Saito et al. In the Saito et al construction, a rotor body is made of carbon steel. A strong but low thermal expansion ring made of 36 weight percent nickel, remainder iron (Invar) is bonded with an acrylic adhesive to the cylindrical surface of the steel rotor. Finally, a ring-shaped rare earth metal-iron permanent magnet is bonded to the nickel-iron ring by the use of the same acrylic-type adhesive. The difficulty with this kind of rotor permanent magnet structure is the increased cost of the Invar material and the cost of its assembly with the rotor and magnet ring. A second disadvantage is the loss in magnetic field properties due to the interposition of the nickel-iron layer between the permanent magnet and the high permeability iron rotor body.

A second solution to the problem of the steel rotor permanent magnet ring structure and usage is the provision of an outer ring of strong, relatively low thermal expansion material over the permanent magnet material, which in this instance is bonded directly to the steel rotor. In this case, the strong outer material applies a compressive stress during expansion of the permanent magnet ring which, hopefully, will prevent its structural failure. It also protects the machine from magnet chips in case of the magnet's disintegration inside the outer ring. Again, this solution requires the making and assembly of an extraneous component in the permanent magnet rotor assembly. The outer ring also requires a further spacing between the permanent magnet material and its opposing electromagnets on the housing of the motor body.

SUMMARY OF THE INVENTION

This invention provides a method of assembling a permanent magnet ring on a metal rotor when the rotor has a greater coefficient of thermal expansion than the ring. In general, it is preferred to use a carbon steel rotor because of its ferromagnetic properties and its strength. Such rotors suitably have a longitudinal shaft and axis about which they rotate and an outer cylindrical surface upon which one or more permanent magnet rings are to be fixed. Of course, the diameter of such cylindrical surface has one value at the ambient conditions at which the ring is assembled onto the rotor and a second value during the operation of an electric motor or alternator when the rotor is heated by energy dissipated during device operation or by a high temperature environment in which it is operating. It is this second cylindrical surface diameter, i.e., the highest operating temperature diameter, that is of concern in the design of the rotor and permanent magnet ring.

In accordance with the invention, the permanent magnet ring is formed with an internal diameter that is at least as large as the high temperature diameter of the cylindrical surface upon which the ring is to be fixed. For example, in the case of a steel rotor having a nominal diameter of 75 mm at normal room temperature, an allowance of 5/100 of a millimeter or so in radius may be appropriate for the design expected thermal expansion of the rotor.

Since the permanent magnet is in the form of a ring, it must have a hoop strength sufficient to resist the tensile forces experienced by it during rotor spin at high velocity. Although the ring configuration experiences substantial internal stress, the ring shape reduces the need for adhesive bonding to the rotor that is required by using several unconnected arcuate magnet sections. Nonetheless, sufficient adhesive must be employed between the cylindrical rotor surface and the inside diameter of the permanent magnet ring to overcome torsional and axial forces acting to displace the ring.

While a lesser amount of an adhesive may be required, provision must also be made for the thermal expansion characteristic of such adhesive that is required to bond the permanent magnet ring to the rotor surface. In general, it is suitable to design the permanent magnet ring with an internal diameter that basically just allows for the thermal expansion of the metal rotor cylindrical surface provided that provision is made in the rotor surface as specified herein to accommodate expansion of the adhesive. In accordance with this invention, grooves or knurls are formed in the cylindrical surface spaced about the entire circumference of the rotor surface to accommodate the expansion of the adhesive. Preferably, such grooves or knurls are aligned longitudinally and are closely and uniformly spaced around the circumference. The depth of these grooves is usually only about half of the room temperature space allotted between the outside diameter of the rotor surface and the inside diameter of the permanent magnet ring. Preferably, such longitudinal grooves are cut into the rotor surface at every two to five degrees of circumferential arc. In other words, about 70 to 180 shallow rotor grooves are used. The grooves are usually machined in the surface of a unitary rotor body in a simple process. Where the rotor is formed of bonded stamped laminations, the grooves are formed by serrations formed at the circumference of each laminate stamping.

The beads or strips of a suitable curable flexible adhesive are then laid longitudinally on the circumferential surface of the rotor. The beads are also spaced apart in strips parallel to the rotor axis and around the circumference of the rotor. Provision is then made to slide a ring over the adhesive bead bearing cylindrical surface of the rotor so that the ring is kept uniformly spaced from the rotor about the whole circumference during such assembly. Suitable spacer strips spaced at, e.g., 60, 90 or 120 degrees of circumferential arc may be placed on the rotor surface for this purpose. The equal spacing between the rotor surface and the permanent magnet ring is maintained until the adhesive cures and a firm bond is made between the permanent magnet ring and the rotor.

In accordance with the operation of this rotor-permanent magnet ring assembly in an electrical machine, the thermal expansion of the rotor which would tend to press the expanding thermoset elastomeric adhesive against the magnet ring simply forces the adhesive film into the grooves in the rotor shaft. It has been found that this practice of designing the magnet ring to accommodate the thermal expansion of the rotor in combination with the use of longitudinal grooves to accommodate the expansion of a relatively soft adhesive film provides a magnet ring-rotor structure which embodies high magnetic durability and performance because of the close spacing between the ring and the rotor as well as the close spacing permitted between the magnet ring and outer lying electromagnets. Furthermore, such assembly practice is inexpensive and easy to carry out.

Other objects and advantages of the invention will become more apparent from a detailed description thereof which follows.

DESCRIPTION OF THE PREFERRED EMBODIMENT

Figure 1:
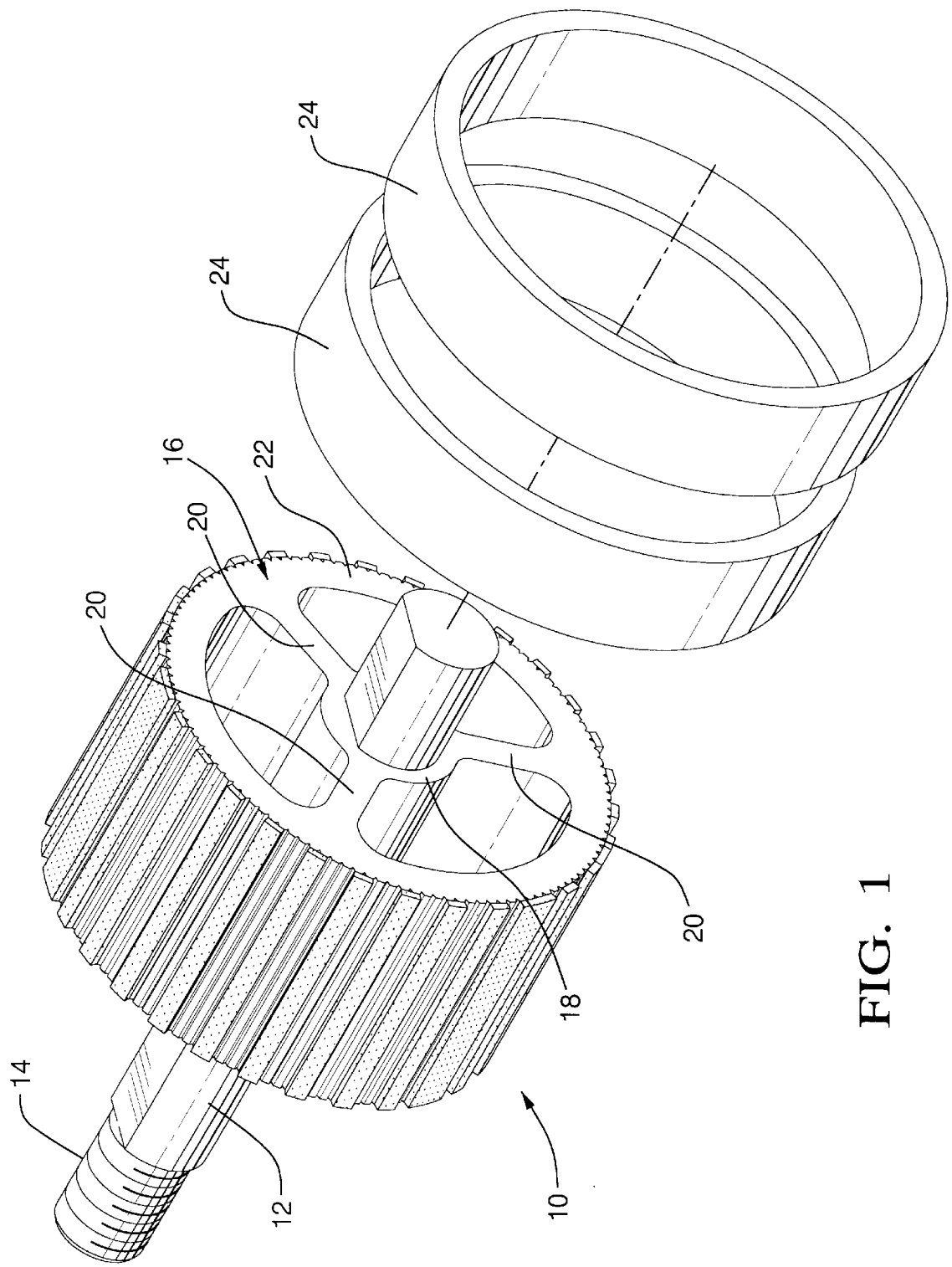
FIG. 1 is a perspective view of an exemplary steel rotor shaft and rare earth-transition metal permanent magnet rings illustrating the assembly practice of this invention.

The practice of the invention will be illustrated with the use of a low carbon steel rotor 10 such as that depicted in FIG. 1. Rotor 10 includes an axial shaft 12 adapted for mounting and rotation within a housing (not depicted) of an electrical machine such as a motor or alternator. Shaft 12 is shown with a threaded end 14 for receiving a pulley or other power transmitting means. Fixed to shaft 12 is rotor body 16 which comprises a hub 18, radial spokes 20, and a cylindrical surface carrying member 22 having a longitudinal axis coincident with the axis of rotation of shaft 12.

Low carbon steel typically has a coefficient of thermal expansion of about $11 \times 10^{-6}/°$ C. A suitable permanent magnet material for rings 24 is a magnetic composition of the rare earth-transition metal-boron type such as the neodymium-iron-boron compositions commercially available as MQ2 (a hot pressed magnet body) or MQ3 (a hot pressed and hot worked permanent magnet body), both trademarked products of Magnequench International, or any of the various sintered permanent magnet products of the same basic composition. Of course, a magnet ring 24 such as those illustrated in FIG. 1 must be designed for suitable strength for the designed rotational speed of the rotor on which it is to be assembled and used. The known mechanical properties of such permanent magnet materials may be employed in connection with conventional strength of materials analyses to determine whether the tensile strength or hoop strength of such rings are suitable for the intended purpose. However, for the purpose of the assembly method of the subject invention, it is important to notice that the coefficient of thermal expansion of an MQ3-type permanent magnet ring varies from about $2 \times 10^{-6}/°$ C. to $5 \times 10^{-6}/°$ C. in the radial direction (parallel to magnetic orientation) to $-2 \times 10^{-6}/°$ C. in the axial direction (perpendicular to orientation). This means that a permanent magnet material of MQ3 composition and metallurgical structure expands considerably less than the steel rotor surface in the radial direction of the magnet ring and actually contracts in its axial direction.

A goal of the subject process is to form a rotor-permanent magnet assembly in which the assembled members can undergo repeated expansion and contraction (i.e., thermocycling) without applying so much stress on the ring (the weakest link in this combination) that it fails.

Figure 2:
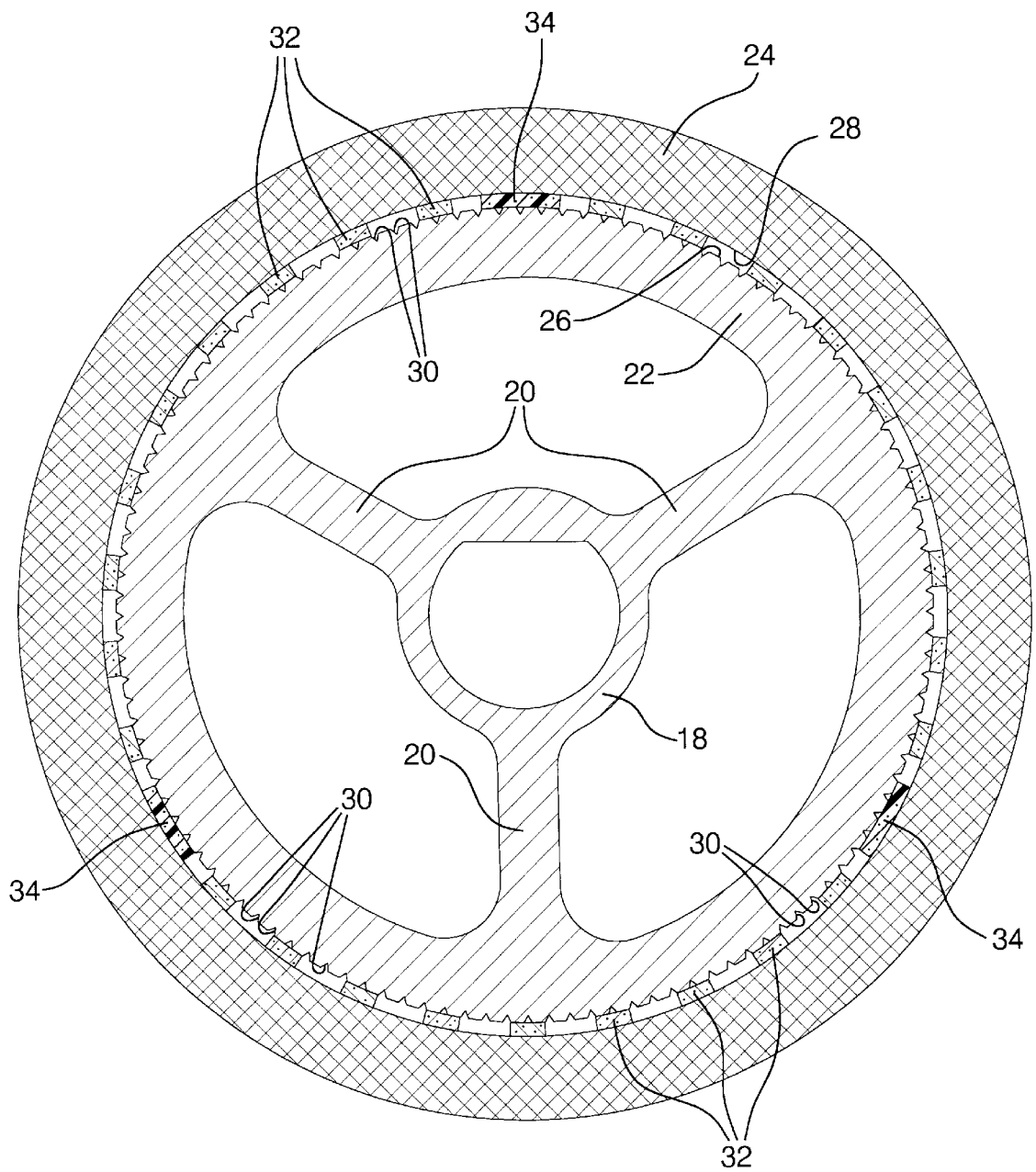
FIG. 2 is a sectional view illustrating the assembled final product. The gap between the rotor and magnet ring in this sectional view is exaggerated to facilitate illustration of elements of the assembly.

Briefly speaking, the subject process contemplates providing a gap between a steel rotor member 22 and a unitary magnet ring 24 just sufficient to compensate for the difference in the radial thermal expansion of the rotor and the ring. Thus, referring to FIG. 2, the internal diameter of internal surface 28 of permanent magnet ring 24 is sized to accommodate the diameter of outer surface 26 of rotor cylindrical member 22 at the highest temperature that the assembly is intended to experience. Although it is intended that an adhesive film will be employed to bond ring 24 to member 22, the internal diameter of ring 24 does not have to be sized to accommodate it.

A suitable adhesive is one which, while providing good bonding strength between the materials of the rotor and ring, has a relatively low modulus of elasticity. A soft, flexible elastomer like adhesive is preferred. Examples of suitable adhesives are the acrylic-based adhesives sold under the name Loctite (for example, Loctite 334) or Dymax 845, which is a urethane oligamer/acrylate monomer blend. Both types of adhesives have tensile or sheer strengths at room temperature of the order of 2800 to 3000 psi, and they are capable of curing in the close gap between a permanent magnet ring and a rotor shaft.

Longitudinal grooves 30 are then cut into the cylindrical surface 26 of unitary rotor member 22 at least in the portions that will underlie a permanent magnet ring 24. As stated, the purpose of grooves 30 is to accommodate expansion of the adhesive bonding layer. The depth of the grooves is suitably about half the design spacing between the rotor cylindrical surface 26 and the internal surface 28 of the ring. Typically, a suitable depth is about 0.001 to 0.004 inch. The grooves are cut into the rotor surface in closely spaced strips suitably up to about five degrees of circumferential arc apart but preferably about two to three degrees apart (see FIG. 2). This means that there will typically be between 70 and 180 such grooves knurled or cut longitudinally into the surface 26 of the rotor member 22.

Thin beads of a suitable adhesive 32 are then placed also in longitudinal strips on the cylindrical surface 26 of the rotor member 22. The beads of adhesive 32 are typically spaced apart by about 12 degrees of arc. It is not necessary that the adhesive completely wet all of the rotor surface and all of the magnet ring surface because adhesive does not need to keep the ring from flying off of the rotor due to centrifugal forces. The main job of the adhesives is to guard against applied torque and hoop stresses due to the spinning.

During the assembly of the ring over the adhesive bearing rotor surface 26, it is desired to maintain equal spacing between the ring 24 and the rotor member 22. This may be accomplished by suitable fixturing of equipment used for such assembly. It may also be accomplished at least in part by the use of suitable spacer strips 34 (FIG. 2) such as Teflon or other thin plastic strips that are of about the same thickness as the gap between the rotor and the ring. Suitably, three to six of these strips are employed at generally equal arcuate spacing to provide for the equal gap.

At this stage, one or more permanent magnet rings 24 are then slid over the adhesive bearing rotor shaft. Any excess adhesive resulting from the assembly is removed, and the adhesive is cured. Depending upon the adhesive, curing may take place at room temperature or with heating. In case of mass production, a few representative assembled rotors may be tested to be sure of the adequate groove depth and spacing as well as for adequate spacing between the internal diameter of the magnet ring and the rotor surface. Such testing usually involves two tests—thermocycling and spin testing. Thermocycling is conducted from ambient temperature up to a maximum contemplated operating temperature for the rotors. After a few heating/cooling cycles have been conducted without failure of the ring, it may be assumed that the groove depth and spacing is suitable as is the initial gap between the magnet ring and rotor. Spin testing, of course, is desirable for evaluating any rotor-magnet ring construction. In the case of evaluating the subject method, the spin testing usually is a measure that is an indication that no undue stresses have been introduced into the ring due to the thermal cycling.

In the operation of an assembled rotor-permanent magnet ring, it is expected and intended that the temperature of the assembly will increase appreciably. The metal rotor will expand more than the magnet ring. The adhesive will also expand more than the magnet ring. However, in accordance with this invention, the initial gap between ring and rotor is substantially uniform for accommodating expansion around the entire circumference of the rotor-ring interface. Furthermore, the grooves in the rotor surface (or ring surface) accommodate expansion of the adhesive.

The above-illustrated embodiment of the invention utilized a unitary rotor member 22 such that longitudinal grooves 30 were cut or knurled into cylindrical surface 26. In another embodiment of the invention, a rotor (or a rotor and stator) is made by stamping a plurality of rotor and stator cross sections from steel sheet stocks. The individual sections or lamina are then bonded together to form a rotor and/or stator. Rotor laminate stampings may be joined face to face with adhesives and/or mechanically interlocked with integrally stamped bosses and recesses. When a rotor is formed of such laminations, the grooves utilized in the process of this invention are made by forming aligned serrations at the circumference of each stamped laminate.

It is preferred to use longitudinal grooves and longitudinal adhesive beads in the practice of the invention. However, it is obvious other groove and adhesive application patterns can be employed. For example, a series of circumferential grooves spaced axially along the rotor surface could be employed, or a diamond pattern of grooves. The adhesive application patterns can be varied to make the best use of the groove pattern.

While the subject method has been described in terms of a specific embodiment thereof, it will be appreciated that other forms could readily be adopted by those skilled in the art. Accordingly, the scope of this invention is intended to be limited only by the following claims.

I claim:

1. A method of assembling a unitary permanent magnet ring on a metal rotor when the rotor has a greater coefficient of thermal expansion than said ring, said rotor having a longitudinal axis of rotation and a cylindrical surface for receiving said ring, said cylindrical surface having a first diameter dimension at normal ambient temperature and a second diameter dimension at the maximum design operating temperature of said rotor, said method comprising forming grooves in said cylindrical surface of said rotor, said grooves being spaced about the entire circumference of the rotor surface, applying a curable adhesive on said cylindrical surface, placing a unitary permanent magnet ring over the adhesive bearing cylindrical surface, the internal diameter of said ring being at least as large as said second diameter dimension, said ring being positioned in generally equally spaced relationship with respect to said cylindrical surface and maintaining said equally spaced relationship between said ring and surface during the curing of said adhesive, the number and volume of said grooves being sufficient to accommodate the expansion of the cured adhesive during a temperature elevation of the assembled ring and rotor.

2. A method of assembling a unitary permanent magnet ring on a metal rotor when the rotor has a greater coefficient of thermal expansion than said ring, said rotor having a longitudinal axis of rotation and a cylindrical surface for receiving said ring, said cylindrical surface having a longitudinal direction aligned with said axis, a first diameter dimension at normal ambient temperature and a second diameter dimension at the maximum design operating temperature of said rotor, said method comprising forming generally equally spaced longitudinal grooves in said cylindrical surface of said rotor at spacings of two to five degrees of circumferential arc, applying generally equally spaced longitudinal beads of a curable adhesive on said cylindrical surface, placing a unitary permanent magnet ring over the adhesive bead bearing cylindrical surface, the internal diameter of said ring being at least as large as said second diameter dimension, said ring being positioned in generally equally spaced relationship with respect to said cylindrical surface and maintaining said equally spaced relationship between said ring and surface during the curing of said adhesive, the volume of said longitudinal grooves being sufficient to accommodate the expansion of the cured adhesive during a temperature elevation of the assembled ring and rotor.

3. A method of assembling a unitary permanent magnet ring on a metal rotor as recited in claim 2 in which said beads of adhesive are applied to said cylindrical surface at spacings of five to 15 degrees of circumferential arc.

4. A method of assembling a unitary permanent magnet ring on a metal rotor as recited in claim 2 in which said unitary permanent magnet ring is formed of a rare earth-transition metal-boron composition and said rotor is a steel rotor.

5. A method of assembling a unitary permanent magnet ring on a metal rotor as recited in claim 2 in which the quantity of adhesive applied to said cylindrical surface is predetermined to form sufficient adhesive wetted surface to resist torsional loads on said ring in the design operation of said assembled ring and rotor.

6. A method of assembling a unitary permanent magnet ring on a metal rotor as recited in claim 2 comprising forming a plurality of circular sheet metal stampings having the diameter of said first diameter dimension of said cylindrical surface, at least some of said stampings having serrations at their circumferences, and bonding together said stampings to form said rotor such that said serrations form said equally-spaced longitudinal grooves.

\* \* \* \* \*